United States Patent [19]

Presnall et al.

[11] 4,265,332
[45] May 5, 1981

[54] HEAT EXTRACTING MUFFLER SYSTEM

[75] Inventors: Lance O. Presnall, Reseda, Calif.; Gary H. Thurner, Saukville, Wis.

[73] Assignee: FMC Corporation, San Jose, Calif.

[21] Appl. No.: 50,730

[22] Filed: Jun. 21, 1979

[51] Int. Cl.³ .......................... F01N 1/14; F01N 5/00
[52] U.S. Cl. ................................. 181/211; 181/262; 181/283; 165/52; 180/54 A
[58] Field of Search ............... 181/204, 262, 282, 283, 181/211; 165/52, 154, 157; 180/54 A

[56] References Cited

U.S. PATENT DOCUMENTS

| 1,025,251 | 5/1912 | Desmond | 181/262 X |
|---|---|---|---|
| 1,370,197 | 3/1921 | de Bolotoff . | |
| 1,635,938 | 7/1927 | Hudson . | |
| 1,730,869 | 10/1929 | Wells . | |
| 1,794,276 | 2/1931 | Bowes . | |
| 2,211,795 | 8/1940 | Sauer . | |
| 2,293,632 | 8/1942 | Sauer . | |
| 2,363,236 | 11/1944 | Fluor | 181/262 |
| 2,396,952 | 3/1946 | Huber . | |
| 3,186,511 | 6/1965 | Kliewer, Sr. . | |
| 3,773,127 | 11/1973 | Aaen et al. | 180/54 A X |
| 3,795,287 | 3/1974 | Rose | 181/283 |
| 3,857,458 | 12/1974 | Ohtani et al. | 181/262 |
| 4,093,039 | 6/1978 | Moore et al. | 181/282 X |

Primary Examiner—L. T. Hix
Assistant Examiner—Benjamin R. Fuller
Attorney, Agent, or Firm—A. J. Moore; J. F. Verhoeven

[57] ABSTRACT

A muffler system positioned within the engine housing of the vehicle such as a garden tractor, includes a muffler surrounded by an open ended tubular heat shield having a venturi tube on its outer end which receives and accelerates the exhaust gases to create a flow of cooling air through the engine housing and between the muffler and the tubular heat shield for extracting heat from both the engine housing and the muffler.

5 Claims, 4 Drawing Figures

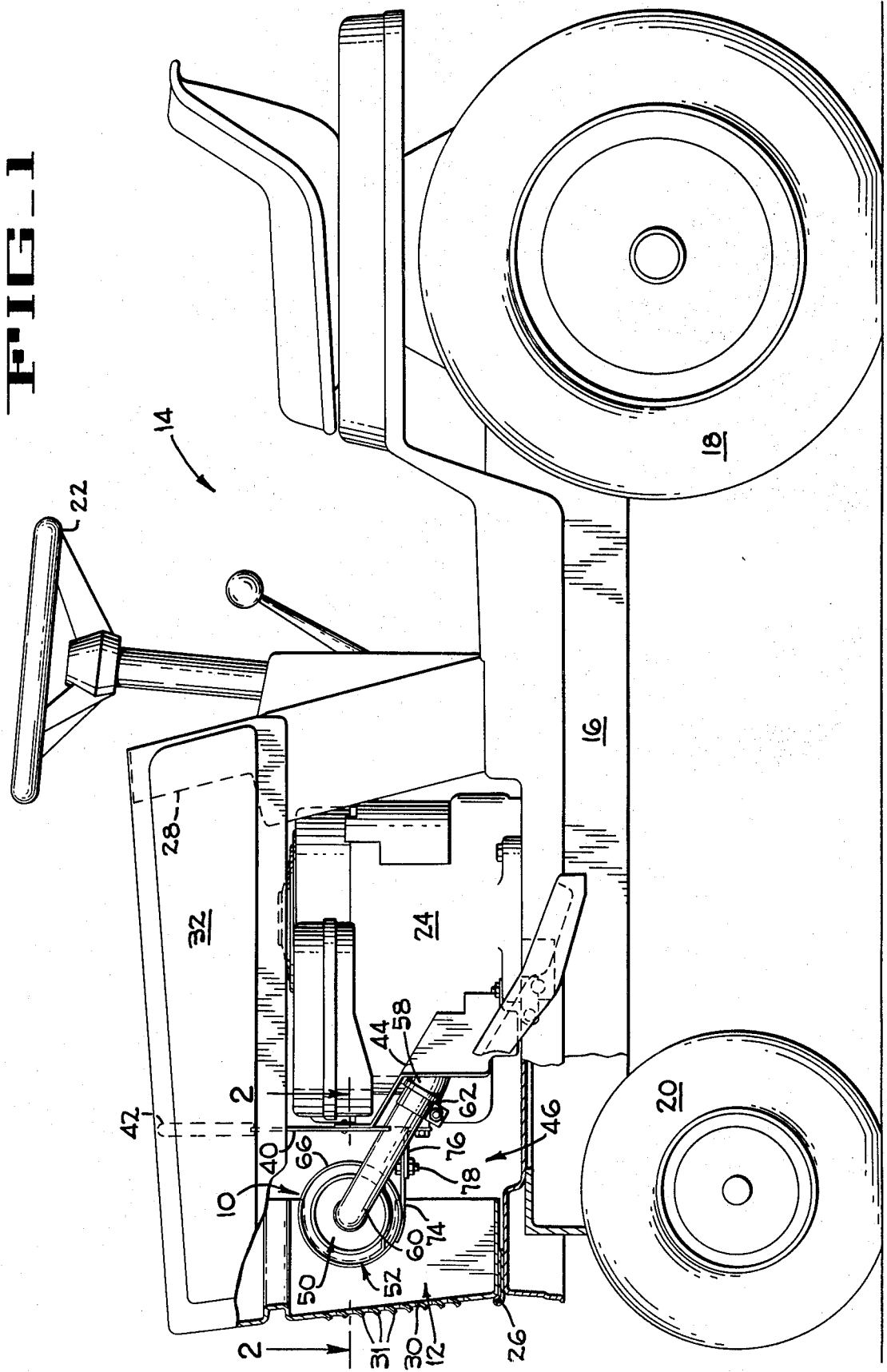
FIG_1

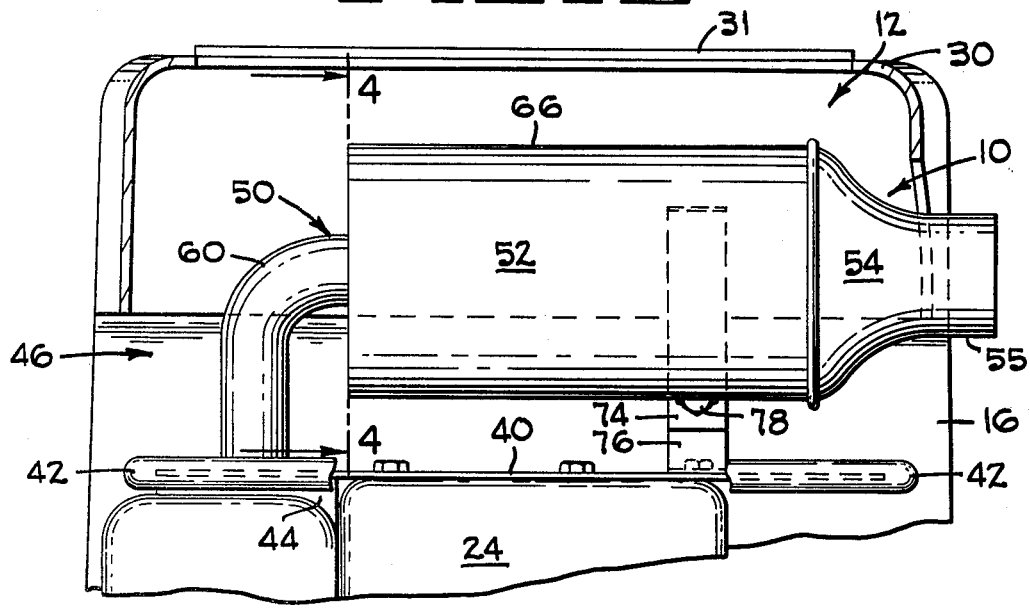
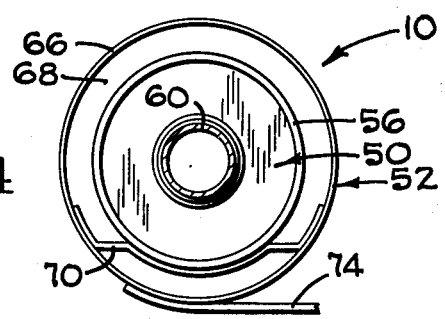
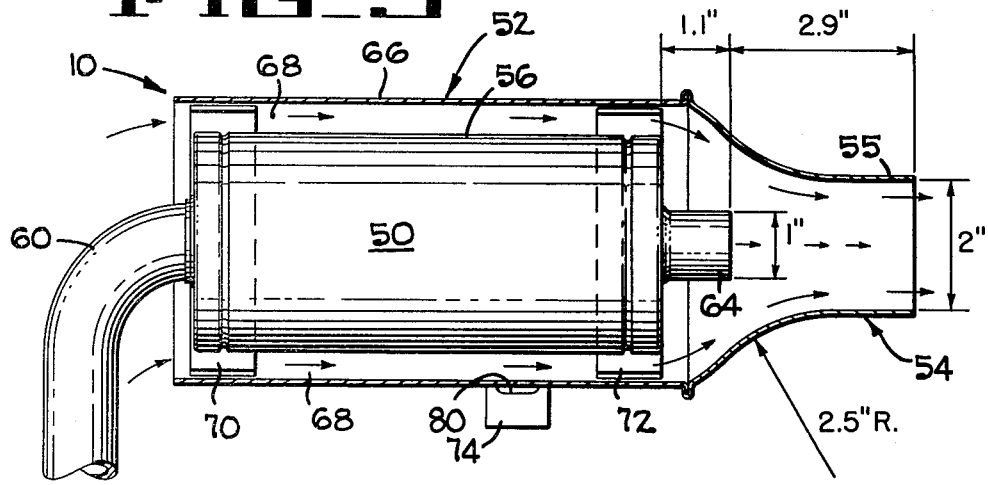

HEAT EXTRACTING MUFFLER SYSTEM

BACKGROUND OF THE INVENTION

1. Field of the Invention

This invention relates to a vehicle muffler system and more particularly pertains to a muffler system that is mounted within an engine housing and includes a venturi extracting heat shield surrounding the muffler which uses the exhaust gases expelled from the muffler for creating an air flow that draws heat from the engine housing and from around the surface of the muffler for discharge externally of the housing.

2. Description of the Prior Art

During the last few years, noise pollution has become a sufficiently serious problem to cause cities and other governmental agencies to set maximum permissible noise standards for garden tractors or the like. In order to comply with these minimum noise standards, mufflers of certain of these garden tractors have been placed within the engine housing of such tractors in order to use the housing itself as an additional sound barrier. However, the hot exhaust gases passing through the muffler creates a considerable amount of heat in the engine housing. Although some of this heat is removed from the housing by means of air circulated by the engine cooling fan, it has been found desirable to remove more heat from the engine housing for operator comfort and in order to reduce maintenance problems and provide for more efficient operation of the vehicle. The U.S. Pat. No. to Nemschoff, 3,884,322, which is assigned to the assignee of the present invention, discloses such a prior art garden tractor with a muffler within its engine housing.

The use of power driven fans within engine housings is, of course, a well known means of removing heat from the engine housing of a vehicle housing. Also, movement of the vehicle at a sufficient speed through the air is another well known way of removing heat from engine compartments of a vehicle.

The desirability of extracting heat from an engine housing having a muffler therein is also taught by U.S. Pat. No. 3,795,287 which issued to Rose on Mar. 5, 1974. Rose discloses a snowmobile muffler which has a radial inlet pipe and a radial outlet pipe. A concentric two-piece shield is provided to guide air between the muffler and the shield to cool the muffler and also to reduce the ambient temperature of the engine compartment. The shield inlet opening and outlet opening are axially elongated slots in the shield. Thus, this patented structure performs the same function as the subject device but in a different way since the patentee does not rely on the venturi effect to draw air past the muffler but relies on the forward speed of the vehicle (or a cooling fan) to create the cooling flow of air.

Desmond U.S. Pat. No. 1,025,251 recognizes that exhaust gases can be used to create an air flow past the cylinder walls of an air cooled engine that is apparently not confined in a housing. Desmond discloses a double walled cylinder having air passages therebetween through which air passes before being drawn into a muffler housing. The exhaust gases are directed through a pipe that terminates in a constricted area or venturi to increase the velocity of the exhaust gases at that point. The high velocity exhaust gas induces active circulation of air between the two walls of the cylinder for the purpose of cooling the cylinder walls. This patent differs from the present invention in that the patentee's muffler itself defines the heat shield and is sealed to the exhaust pipe at one end, whereas the heat shield of the subject invention is spaced from the muffler, is open at both ends, and also draws heated air from an engine housing.

U.S. Pat. No. 2,363,236 which issued to Flour on Nov. 21, 1944 discloses an air cooled muffler with the exhaust gases passing through a venturi into a throat for inducing a high velocity flow of air along the exhaust pipe and muffler. The muffler receives exhaust gases from an engine through an exhaust pipe. The muffler is enclosed within an outer conduit or stack that includes a cylindrical shell section, a cone, and a nipple 33. Although Flour discloses the concept of cooling a muffler that is outside of the engine housing by using exhaust gases to induce an air flow therepast, he does not suggest anything about extracting heated air from the engine housing.

SUMMARY OF THE INVENTION

The heat extracting muffler system of the present invention is disposed within a semi-isolated compartment of the engine housing of a vehicle, such as a tractor or the like, and includes a tubular heat shield which surrounds a muffler and has a venturi nozzle formed on its output end for accelerating the exhaust gases discharged from the muffler. The exhaust gases create an airflow which draws heated air from the engine housing and its muffler compartment, and which then causes the air to enter the tubular heat shield through a large inlet opening in the shield. The cooling air then flows past the outer surfaces of the muffler to cool the same before mingling with and cooling the exhaust gases. The resulting mixture of cooling air and exhaust gases is discharged from the venturi tube to the atmosphere.

Thus, a separate cooling fan, which would require power from the engine to drive the same, is not required in order to cool the muffler. It is, of course, understood that the standard air cooled engines used to power the vehicles include built in fans but such fans have capacity sufficient to adequately cool only the engine, not the muffler and the engine.

It is therefore one object of the present invention to provide a heat extracting muffler system which utilizes a muffler heat shield and a venturi tube for causing the engine exhaust gases to create a flow of cooling air to extract heat from the muffler as well as from a housing within which the muffler is positioned.

BRIEF DESCRIPTION OF THE DRAWINGS

FIG. 1 is a side elevation of a garden tractor with certain portions of its engine housing and muffler compartment cut away to illustrate the heat extracting muffler system of the present invention FIG. 2 is an enlarged horizontal transverse section taken along lines 2—2 of FIG. 1.

FIG. 3 is an enlarged horizontal section taken through the heat shield with the muffler being shown in full.

FIG. 4 is a section taken along lines 4—4 of FIG. 2 illustrating one of the straps for supporting the muffler concentrically within the heat shield.

DESCRIPTION OF THE PREFERRED EMBODIMENT

The heat extracting muffler system 10 of the present invention is illustrated in FIG. 1 as being disposed within an engine housing 12 of a vehicle such as a garden tractor 14. The garden tractor 14 is of standard design and includes a chassis 16 mounted on a pair of drive wheels 18 and a pair of steerable wheels 20 controlled by a steering wheel 22. An engine 24 is secured to the chassis 16 and is connected to the drive wheels 18 by a well known transmission.

The engine 24 and heat extracting muffler system 10 are disposed within the engine housing 12 which is pivoted to the chassis by a hinge 26 at its forward end and has its rearward end portion locked to a rear end wall 28 by conventional clamp means (not shown). The engine housing 12 includes a front portion 30 with louvers 31 therein, and a cover portion 32 which are rigidly secured together as by welding. Although the illustrated preferred embodiment of the invention does not include side panels which fully enclose the sides of the engine housing since the present government noise standards are satisfied without requiring such full closure side panels, it will be understood that the scope of the invention is to be considered broad enough to cover engine housings that include side panels of the type disclosed in the previously referred to Nemschoff U.S. Pat. No. 3,884,322. The disclosure of this Nemschoff patent is incorporated by reference herein, and may be referred to if desired for a more complete description of an engine housing of the general type referred to herein.

In order to partially isolate the engine 24 from the heat radiating from the muffler as much as possible, the forward portion of the engine housing 12 is somewhat separated from the rear portion of the housing by a vertical baffle 40 (FIGS. 1 and 2) that is secured to the front of the engine 24. The upper portion of the baffle 40 is provided with a pad 42 to prevent rattles from occurring when the housing cover is resting on the baffle in its operative position illustrated in FIG. 1. A somewhat Z-shaped baffle 44 (FIG. 1) is secured to the front and base of the engine 24 only on its left side for the purpose of minimizing exhaust manifold heat from adversely affecting the engine accessories such as the carburetor positioned thereabove. Thus, a muffler compartment 46 is defined in the front portion of the engine housing 12 by the forward portion of the engine housing and the baffles 40 and 44.

The heat extractor muffler system 10 (FIGS. 1, 2 and 3) of the present invention comprises a muffler 50 surrounded by a tubular heat shield 52 having an outer end portion that defines a venturi tube 54.

The muffler 50 is of standard internal design and has a body 56 with its inlet end connected to the outlet end of the exhaust manifold 58 (FIG. 1) of the engine 24 by an elbow 60 and clamp 62. A short, tubular exhaust pipe 64 (FIG. 3) on the discharge end of the muffler body 56 directs the exhaust gases into the venturi tube 54.

The cylindrical heat shield 52 includes a large diameter cylindrical body 66 connected to the venturi tube 54 which has a small diameter portion 55. The heat shield 52 is concentric with and surrounds the body 56 of the muffler 50 to define an annular air passage 68 therebetween. A pair of longitudinally spaced, curved straps 70, 72 (FIGS. 3 and 4) are welded to the inner surface of the heat shield body 66 and to the lower portions of the outer surface of the muffler body 56 to maintain the muffler and heat shield 52 concentric.

The muffler 50 and cylindrical heat shield 52 are supported as a unit by the inlet elbow 60; and by a strap 74 (FIG. 1) welded to the outer surface of the heat shield body 66 and connected to an angle bracket 76 that is bolted to the engine 24. The strap 74 and angle bracket 76 are connected together by a bolt 78 with the aid of a slot 80 (FIG. 3) in the strap 74.

During operation, the fan (not shown) of the engine, which engine is illustrated as an air-cooled engine 24, draws air into the top of the engine and directs a major portion of the air downwardly and forwardly past the cylinders. The engine exhaust gases are directed through the muffler 50 (FIG. 3) and into the venturi tube 54 of the heat shield 52. The pressure of the hot exhaust gases discharging from the exhaust pipe 64 is reduced as the gases enter the small diameter portion 55 of the venturi tube thus resulting in a substantial increase in velocity of the exhaust gases as they leave the venturi tube and enter the atmosphere externally of the housing 12. This high velocity exhaust gas creates a substantial flow of cooling air through the annular passage 68 between the muffler 50 and a tubular heat shield 52, which air mingles with and cools the exhaust gas when in the venturi tube 54. The main flow of cooling air induced by the fan of the engine 24 and by the heat extracting muffler system 10 of the present invention appears to be downward and forward past the engine cylinders at the center of the vehicle, then forward and below the baffle 40 and upward into the muffler compartment 46. This main air flow then moves from the center to the left within the muffler compartment 46 before it enters the inlet end of the annulus 68. As the cooling air rapidly moves through the annulus 68 it cools the external surfaces of the muffler 50 and extracts heat from the engine housing 12 as well as from the muffler and muffler compartment 46, which compartment is a portion of the engine housing. Although louvers 31 are provided on the front of the housing 12, the louvers 31 are primarily for appearance and have little effect on the air flow or cooling.

Certain tests have been conducted with tractors powered with 8 and 11 horsepower air cooled engines. These tests indicate that mufflers 50 that are about $3\frac{1}{4}$ inches in diameter, and have an exhaust pipe diameter of 1 inch in diameter, when mounted concentrically within a heat shield 52 having a body that is about $4\frac{1}{4}$ inches in diameter operate most efficiently when the small diameter portion of the venturi tube 54 is about 2 inches in diameter. It has also been determined that the optimum distance between the end of the exhaust pipe 64 and the discharge end of the small diameter portion of the venturi tube 54 is about 2.9 inches when the radius of curvature of the venturi is about 2.5 inches.

Tests have indicated that the venturi effect is greatly diminished when, for example, the venturi outlet diameter is increased to about 2.5 inches in diameter; or when the end of the exhaust pipe 64 is moved to a position near, or within, the reduced diameter portion of the venturi tube.

Thus, the following dimensional relationship and ratios are critical when the muffler and heat shield are cylindrical as in the illustrated preferred embodiment. The ratio of the distance between the discharge end of the exhaust pipe and the discharge end of the venturi tube relative to the diameter of the exhaust pipe should be about 3 to 1. The ratio of the diameter of the smallest diameter portion of the venturi tube relative to the diameter of the exhaust pipe should be about 2 to 1. The ratio of the diameter of both said large diameter portion of said venturi tube and the diameter of the body of the heat shield relative to the diameter of the exhaust pipe should be about $4\frac{1}{4}$ to 1. The ratio of the outside diameter of the muffler relative to the diameter of the exhaust pipe should be about 3¼ to 1; and preferably a radius of curvature is provided between the large and small diameter portions of the generally frusto-conical contour of the venturi tube and its ratio relative to the smallest diameter of the venturi tube is about 1¼ to 1.

When testing the heat extracting muffler system 10 of the present invention when the outside or ambient temperature was between about 70° F.–76° F., when 8 to 11 horsepower air cooled engines were used, and when the optimum dimensions indicated above were used; it was determined that the velocity of the air flow through the annulus 68 (FIG. 3) was between about 1200 to 1700 feet per minute, with unloaded and loaded engines, respectively. Under these conditions the temperature of the air passing out of the annulus 68 was about 275° F. and the temperature of relatively stagnant air within the upper front end of the muffler compartment 46 was about 114° F.

From the foregoing description it is apparent that the heat extracting muffler system of the present invention permits a muffler to be positioned within an engine housing without excessively raising the housing temperature by using the exhaust gases and venturi tube to create a flow of cooling air through the engine housing. The cooling air also flows through an annulus between the muffler and a tubular heat shield and into the venturi tube to cool the muffler and extract warm air from the muffler as well as from the engine housing.

Although the best mode contemplated for carrying out the present invention has been herein shown and described, it will be apparent that modification and variation may be made without departing from what is regarded to be the subject matter of the invention.

What we claim is:

1. A heat extracting muffler system for a vehicle having an engine and a muffler disposed within an engine housing comprising: means connecting the muffler to the engine for communicating hot exhaust gases from the engine to and through the muffler; means defining an exhaust pipe included in said muffler for discharging said gases therefrom; and means defining an open ended tubular heat shield surrounding said muffler and said exhaust pipe, said tubular heat shield means including a body portion and means defining a venturi tube connected to said body portion and projecting out of said housing; said muffler, said tubular heat shield body and said venturi tube being of cylindrical external cross-section and being generated about a common horizontal axis extending transversely of the engine housing; said venturi tube means being of generally frusto-conical configuration and receiving the end portion of said exhaust pipe for accelerating said exhaust gases which create an airflow through an annular passage between said muffler and said heat shield for drawing warm air from said engine housing and for cooling the peripheral surfaces of said muffler before discharging the air and exhaust gases externally of said housing, said tubular heat shield body having a large diameter inlet end and said venturi tube having its smallest diameter at its outlet end.

2. An apparatus according to claim 1 and additionally comprising baffle means within and extending transversely of said engine housing defining a muffler compartment having an open bottom for partially isolating said muffler from said engine, said cooling air flow having a main portion moving past one side of the engine, then moving below said baffle means and transversely toward the other side of the engine before entering said annular passage.

3. An apparatus according to claim 1 wherein the ratio of the distance between the discharge end of the exhaust pipe and the discharge end of the venturi tube relative to the diameter of the exhaust pipe is about 3 to 1; and wherein the ratio of the diameters of: said small diameter portion of said venturi tube relative to said exhaust pipe is about 2 to 1; said large diameter portions of both said venturi tube and the diameter of the body of said heat shield relative to the exhaust pipe are about 4¼ to 1; the outside diameter of said muffler relative to said exhaust pipe is about 3¼ to 1; and a radius of curvature between the large and small diameter portion of the generally frusto-conical venturi tube relative to said small diameter portion is about 1¼ to 1.

4. An apparatus according to claim 3 wherein the diameter of said exhaust pipe is about 1 inch when said muffler system is handling the exhaust gases from engines rated at between about 8 to 11 horsepower.

5. An apparatus according to claim 4 wherein when operating the vehicle when the ambient temperature is between about 70° F. and 76° F., the velocity of air flow through the annulus is about 1200 to 1700 feet per minute; the temperature of the air passing out of the annulus is about 275° F.; and the temperature of relatively stagnant air within the upper portion of the engine housing is maintained at about 114° F.

* * * * *